United States Patent [19]

Ollerenshaw et al.

[11] Patent Number: 5,542,962
[45] Date of Patent: Aug. 6, 1996

[54] TREATING BIOMASS MATERIAL

[75] Inventors: Robert C. A. W. Ollerenshaw, Knutsford; Maurice A. Roe, Bowden, both of United Kingdom

[73] Assignee: Fi-Pro Limited, Cheshire, United Kingdom

[21] Appl. No.: 157,095

[22] PCT Filed: May 29, 1992

[86] PCT No.: PCT/GB92/00974

§ 371 Date: Mar. 29, 1994

§ 102(e) Date: Mar. 29, 1994

[87] PCT Pub. No.: WO92/21735

PCT Pub. Date: Dec. 10, 1992

[30] Foreign Application Priority Data

Jun. 1, 1991 [GB] United Kingdom ............... 9111838

[51] Int. Cl.⁶ .................................................. C05F 5/00
[52] U.S. Cl. .................................. 71/10; 44/606; 426/271
[58] Field of Search ............................. 44/606; 426/271; 71/8–10

[56] References Cited

U.S. PATENT DOCUMENTS 3,950,143  4/1976  Pyle ......................................... 44/1 C
4,787,917  11/1988  LeClerc de Bussy .................. 44/606
5,023,097  6/1991  Tyson ....................................... 426/271

*Primary Examiner*—Ferris Lander
*Attorney, Agent, or Firm*—Webb Ziesenheim Bruening Logsdon Orkin & Hanson, P.C.

[57] ABSTRACT

A method of treating biomass material e.g. straw, comprises heating the biomass material to a treatment temperature below a temperature at which the material would undergo combustion, washing the biomass material, and partially redrying the washed material thereby to produce a material which may be used as a substitute for peat.

10 Claims, 5 Drawing Sheets

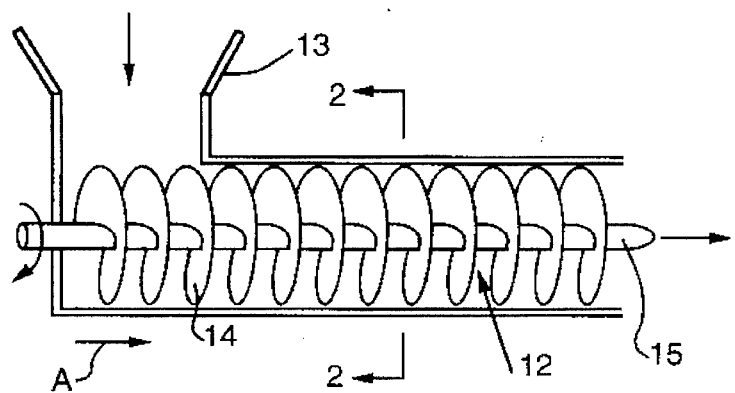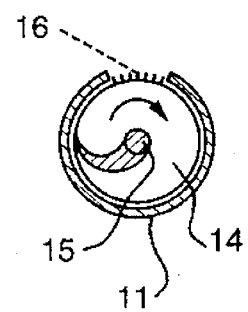
FIG. 2    FIG. 2a
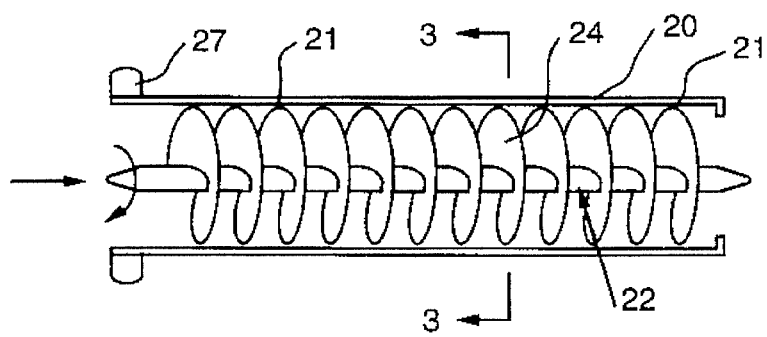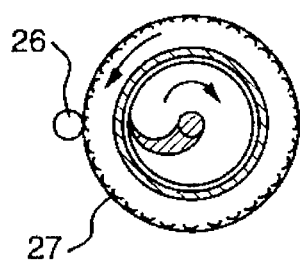
FIG. 3    FIG. 3a
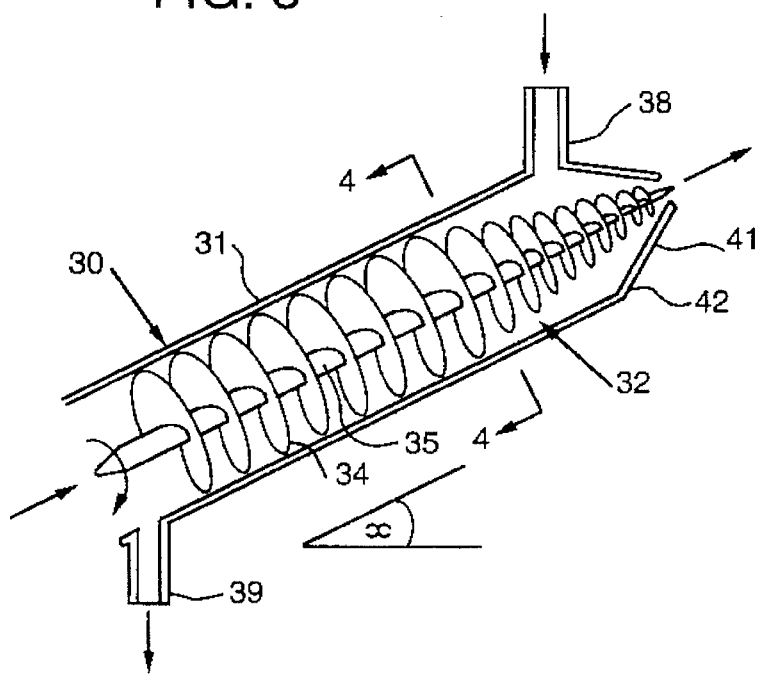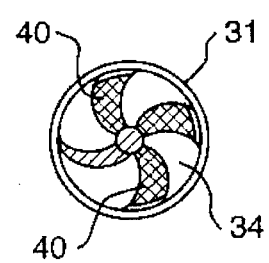
FIG. 4    FIG. 4a

TREATING BIOMASS MATERIAL

DESCRIPTION OF INVENTION

This invention relates to a method of treating biomass material by which we mean particularly, but not exclusively, vegetable matter such as bracken or straw.

By "straw" we mean the remnant created during the harvesting of crops such as barley, wheat or other grains, oil seed rape etc. for examples, or other agricultural waste such as is created during the harvesting of beans (haulm), brassicas etc. The method is however applicable to the treatment of any other biomass material, such as sewage sludge, and other organic waste.

According to one aspect of the invention we provide a method of treating biomass material, the method comprising heating the biomass material without wetting, and substantially at ambient pressure, to a treatment temperature of at least 200° for a treatment time sufficient for the material to undergo partial pyrolysis only.

According to a second aspect of the invention we provide a treatment system for treating biomass material by a method according to the first aspect of the invention, the system comprising means to heat the biomass material without wetting, and substantially at ambient pressure to a temperature of at least 200° C. for a treatment time sufficient for the material to undergo partial pyrolysis only.

BRIEF DESCRIPTION OF THE DRAWINGS

The invention will now be described with reference to the accompanying drawings in which:

FIGS. 2 and 2a are side and sectional illustrative views of a drying apparatus, being a part of a first embodiment of a biomass treatment system which is operated in accordance with the invention;

FIG. 3 and 3a are side and sectional illustrative views of a heat treatment apparatus being a further part of the first embodiment of biomass treatment system for use in the system of FIG. 1, FIGS. 4 and 4a are side find sectional illustrative views of a washing apparatus being a yet further part of the first embodiment of biomass treatment system.

The invention will be exemplified with reference to the following two examples.

EXAMPLE 1

Figure 1:
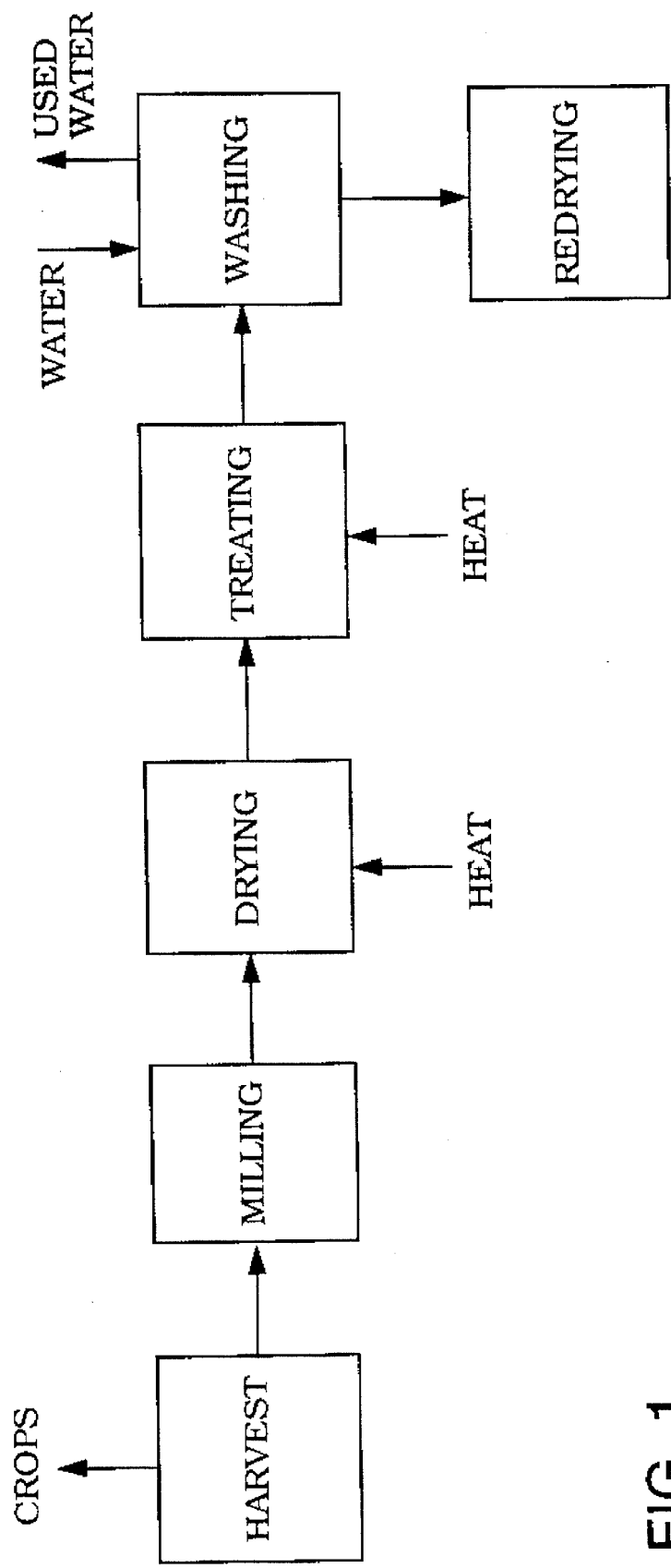
FIG. 1 is a block diagram showing the treatment steps in a biomass treatment system, which is operated in accordance with the invention.

Referring to FIG. 1, the oil seed rape straw was harvested and baled and left on the field to dry out partially, naturally. The baled straw was then collected and fed into a milling machine which crushed and cut the straw into smaller fragments having a size such that most of the fragments produced would pass through a mesh of sieve size 5 mm.

The straw was milled in a conventional milling machine such as is sold by Cormall, the machine actually used being a type HD84D. Of course, any other suitable type of milling machine which can mechanically act upon the straw to cut and crush the straw could alternatively be used to mill the straw.

Next, the milled straw was force dried and at least partially sterilised at a temperature of 100° C. or less so as to drive off moisture but not to affect the chemical composition of the straw.

The straw was force dried in an apparatus such as is illustrated at 10 in FIGS. 2 and 2a, the apparatus comprising an outer casing 11 and an inner screw conveyor or auger 12. The auger 12 is rotatable in the outer casing 11 by any desired means such as a dedicated electric motor, an internal combustion engine, or even by the power take-off of a tractor. Straw is fed into a hopper 13 and moved along the outer casing 11 in the direction of arrow A by a helical fin or rib which is labelled at 14, the fin or rib 14 each extending outwardly from a centre part 15 of the auger 12 in a helical configuration.

The auger 12, as well as moving the straw along the apparatus 10, agitates the straw so that the straw comes into contact with the inside surface of the casing 11 which is heated. Heating of the casing 11 may be achieved by any desired means such as for example electrical elements, hot air, or even burners.

Alternatively to heating the casing 11, hot air or combustion gas may be fed into the casing 11.

The outer casing 11 illustrated includes a perforated upper wall part 16 to allow steam and water vapour produced during drying to be vented from the casing 11.

Such an apparatus 10 may be of any desired length and the temperature to which the straw may be heated therein, may be chosen as desired to achieve a desired degree of heating and drying but preferably without thermochemically changing the constitution of the straw. In the example described, the straw was dried until it had a moisture content of 5% or less.

It is envisaged that if desired, the casing 11 could be internally pressurised so that the milled straw is dried by heating to above 100° C. Further, any steam given off can be recycled to preheat the straw prior to drying, if desired.

When the straw material was dried to a desired extent, the material was heat treated. It was found to be essential to heat the material sufficiently to cause the thermo-chemical production of some carbon, and caramel (from sugars in the straw) by partial pyrolysis so as to achieve a physical change, and a colour change at the outer surface of the material.

However, it was found that if the material was overheated, combustion would take place.

The maximum temperature to which this particular type of straw could be heated before combustion would take place, in the apparatus to be described with reference to FIGS. 3 and 3a, was found to be about 250° C. At this temperature, the outer surface of each fragment of the straw material was charred to produce some carbon, whilst inside the material, some caramel was produced. The heat treatment was carefully controlled to ensure that combustion of the straw material did not occur.

Referring to FIGS. 3 and 3a, the heat treatment was performed in an apparatus 20 similar to that shown at FIGS. 2 and 2a. However, as well as an inner auger 22 being rotated, an outer casing 21 thereof was also rotated, but in an opposite direction to the auger 22. Rotation of the outer casing 21 was achieved by means of a drive wheel 26 driven from a suitable motive source, which frictionally contacted a rubber tyre 27 which was secured to the outer surface of the casing 21.

Heating (and further sterilisation) was achieved by heating the casing 21 e.g. using a propane burner. Ventilation points were provided along the heat treatment apparatus 20 as were found to be necessary to permit smoke produced during partial pyrolysis, to escape.

Again, the straw material was agitated by the action of the auger 22, as it was conveyed along the apparatus 20 by a helical fin or rib 24.

Tube 21 is rotated not only to assist agitation of the material being heated, but also to prevent the tube 21 from distorting due to differential heating effects.

The final section of the heat treatment apparatus 20 (where comprising a plurality of sections), or the end region of the apparatus 20 adjacent the outlet, may have means to cool and/or dampen the treated material so that there is no risk of combustion as the material again comes into contact with the air.

The material was thus heat treated by heating to about 250° C. for up to 2 minutes, but preferably at least ½ minute. If desired, the material could be heat treated by heating to a lesser temperature, but at least 200° C., for a longer period. In each case, the treatment produced some carbon and some caramel.

The still hot material, at its elevated temperature above ambient temperature, was washed with water. This was found to be desirable in the dry heating process described to remove some of the salts present in the straw material, and some of the residual sugar. Also, char and/or smoke odour was removed from the material by the washing process to make the end material more acceptable.

Subsequent to washing, the material was partially redried to leave a residual moisture content of about 50–70%, but preferably at least 50%.

Referring to FIGS. 4 and 4a there is shown a washing apparatus 30 which also is capable of partially redrying the material after washing, as will be described.

The apparatus 30 comprises an outer casing 31 and an inner auger 32. The auger 32 comprises a centre part 35 which is rotated by any desired motive means, a helical rib or fin formation 34 being provided on the centre pant 35.

The whole apparatus is inclined to the horizontal at an angle of about 30° but may be inclined at a greater angle e.g. up to 70° or even vertical.

As the heat treated straw material is conveyed up the apparatus 30 by the auger 32, the material is churned.

At the same time, cool water is fed into the casing 31 through an inlet 38, the water flowing downwardly under gravity towards an outlet 39, and as it flows, extracting heat and salt/sugars from the material in the casing 31.

As indicated in FIG. 4a, the helical fin or rib 34 may have perforated parts 40 as shown, or parts of the fin or rib 34 may be omitted to facilitate the flow of water.

Thus the material is washed as it flows towards an outlet 41 of the casing 31.

Just prior to the outlet 41, the outside diameter of the casing 31 reduces so that material becomes compacted and hence squeezed in the upper region 42 of the casing 31. Water which is squeezed from the material of course also flows downhill under gravity towards the outlet 39 to assist washing. Thus the material is partially redried and is pressed from the casing 31 through the outlet 41 at a collection point. The material may then be further redried if necessary, for example by placing in a warm atmosphere and/or packed and delivered to a point of delivery for use.

Instead of the outside diameter of the casing 31 reducing as the casing approaches opening 41, any other means for causing compaction and hence squeezing of the material prior to it leaving the casing 31, could be devised. For example, the diameter of the centre part 35 of the auger 32 may be increased in end region 42 so as to reduce the volume of space available for the material in the upper region 42 of the casing 31. Alternatively, the helix angle of the helical rib or fin 34 may be changed in region 42 to cause compaction of the material, or a double start helix may be provided at the end of auger 32 adjacent opening 41.

In each case, the material is partially redried as it leaves the washing apparatus 30.

EXAMPLE 2

Harvested and milled straw material obtained as in the first example, was dryed and heat treated in an apparatus which combined drying and at least initial or pre-heating.

Figure 5:
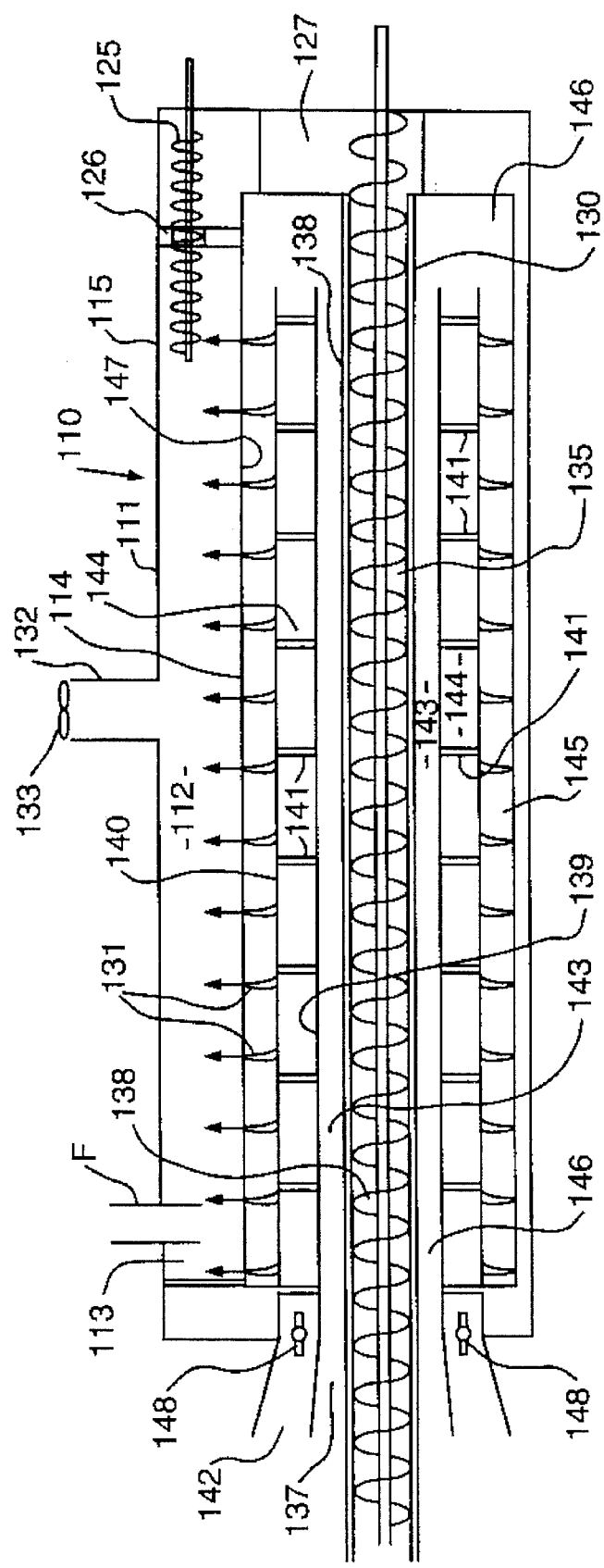
FIG. 5 is a side illustrative sectional view of a combined drying, and heat treatment being a part of a second embodiment of a biomass treatment system which is operated in accordance with the invention.
Figure 6:
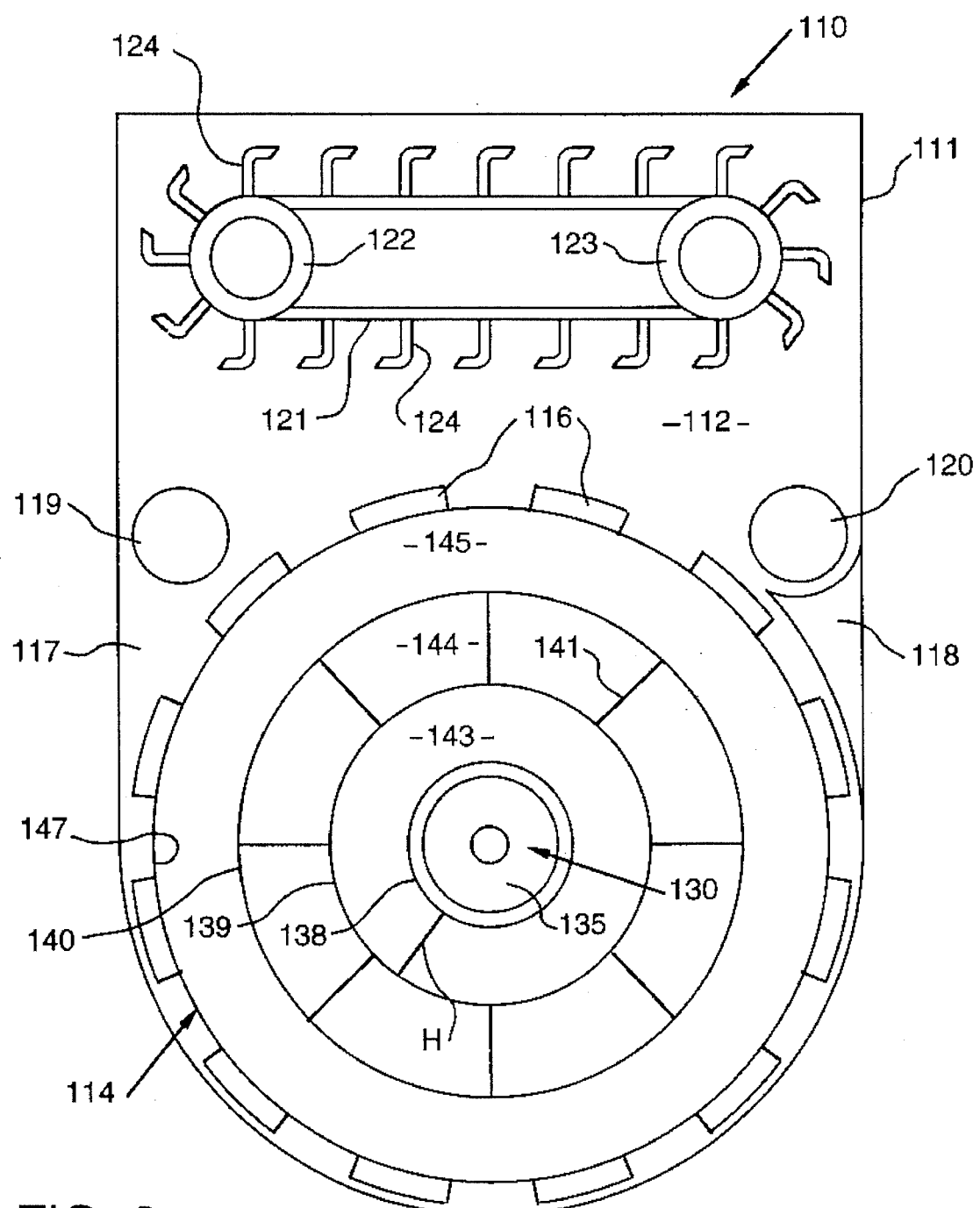
FIG. 6 is an end illustrative view of the apparatus of FIG. 5.

Referring now to FIGS. 5 and 6, the combined apparatus for drying and preheat treatment of biomass material is indicated at 110.

The apparatus has an outer casing 111 with a feed opening F for milled comminuted biomass material, which permits the biomass material to be fed into a space 112 towards one end 113 of the apparatus 110, above a rotating drum 114 to be described.

The material is fed along the space 112 towards an opposite end 115 of the apparatus 110 by the action of splines 116 on the outside wall of the rotating drum 114 (not shown in FIG. 5). Any tendency of the biomass material to gather and compact at sides 117,118, of the space 112, is offset by respective rotating augers 119,120 (which are not shown in FIG. 5) and one or more transversely extending looped chains 121 located along space 112. The chain or chains 121 are driven from sprocket wheels 122,123 so that the chain or chains 121 are driven transversely of space 112. The chain or chains 121 each carry a plurality of teaselers 124 thus to spread the biomass material transversely of space 112.

Adjacent opposite end 115 of the apparatus 110, the material is removed from the space 112 by an auger 125 which passes through a diaphragm seal 126 into a V-shaped chamber 127 from where the material is drawn into a heat treatment chamber 130.

The drum 114 has a plurality of openings 131 to permit hot air to pass from within the drum 114 into the space 112 thus to dry the material as it is conveyed along space 112. The casing 111 has at least one further opening 132 through which air is extracted from space 112 by a fan 133 to assist air flow through the material.

By selecting the rate of rotation of the drum 114 and the rate of air flow, the biomass material can be dried to a desired extent whilst in the space 112, for example to leave about 5% moisture in the material or less, as in example 1 previously described.

The heat treatment chamber 130 is arranged concentrically within the drum 114 and has within it a rotating auger 135 which collects dried material from the chamber 127 and conveys the material back towards end 113 of the apparatus 110. As the material is conveyed in chamber 130, the material is subjected to heat and is thus heat treated.

To heat the material, hot air heated by a flame at a temperature typically of 1100° C., is fed into the drum 114 at end 113 thereof through a first annular inlet 137. The hot air may typically be of a temperature of about 400° C. when it enters the drum 114 and this heats outside wall 138 of the heat treatment chamber 130 to about 400°. However, because the biomass material within the chamber 130 is being continuously agitated by the auger 135, the biomass material spends only a short length of time in actual contact with the wall 138. Hence the material does not attain a temperature close to 400° C. but rather attains a temperature of about 250° C. to which it is subjected for a time depending upon the rate at which the material is conveyed along chamber 130 and any further heat treatment chambers, as hereinafter described.

To make a satisfactory end product, the material is preferably heat treated such that the material only undergoes partial pyrolysis to form some carbon and caramel as it is conveyed. The material however has to be heated to about 200° C. to undergo sufficient pyrolysis within a practical timeframe but more preferably is heated to about 250° C., typically for around 2 minutes but at any event, less than ten minutes and more typically, less than five minutes.

The heat treatment chamber 130 extends outwardly of end 113 of the apparatus 110 as far as needs be and if desired, the material may undergo changes in direction of conveying as it is heat treated so that the apparatus 110 does not become so long as to be unwieldy. For example, the material may be fed into a further heat treatment chamber transverse to chamber 130, or into a further heat treatment chamber generally parallel to chamber 130 but conveying the material in an opposite direction to chamber 130.

The material may be heated in the further heat treatment chamber, outside of the apparatus 110 by burners or the like playing on a rotating, outside wall of the chamber or by any other suitable heating means as desired.

The hot air fed into drum 114 is mixed with cooler air before passing through the openings 131 in the drum 114 into space 112. This is achieved by there being two concentric walls 139,140 within chamber 114, the walls 139,140, being secured to one another by a plurality of spiders or spokes which do not obstruct air flow 141 and thus walls 139,140, rotate with the remainder of the drum 114 about the heat treatment chamber 130.

The walls 139,140 thus provide a second annular inlet 142 for secondary air preferably at ambient temperature, and three annular concentric chambers 143,144 and 145. The arrangement is such that primary (hot) air entering the drum 114 at about 400° C. through inlet 137, passes along chamber 143 in contact with the wall 138 of the heating chamber 130 until it reaches a space 146 at end 115 of the apparatus 110 where it is mixed with secondary air which has entered chamber 114 through inlet 142 and passed along chamber 144 to space 146. In practice, the hot air and ambient air would be mixed in typically a 1:4 to 1:5 ratio, by volume, so that when the hot air and the ambient secondary air mix the temperature of the air is cooled significantly. The mixed hot and secondary air then enter chamber 145 adjacent the inside of the drum wall 147, and flows along chamber 145 from where it passes through the openings 131 into the drying space 112 as previously explained.

It will be appreciated that although the temperature of the hot air introduced into the apparatus through inlet 137 is typically at about 400° C. the hot air will rapidly cool and by the time the hot air reaches chamber 146 at end 115 of the apparatus, its temperature will be about 350° C. typically.

The secondary air which enters the apparatus 110 through inlet 142 will typically be at an ambient temperature of about 15° C. and will become heated slightly as it passes along chamber 144 towards end 115 of the apparatus, where it will attain a temperature typically of about 25° C.

The temperature of the mixed air which passes along chamber 145 and thereafter into the drying space 112, is typically about 90° C.

Preferably within the annular chamber 143 there is provided a helix formation H (not shown in FIG. 5) which serves to turbulate the air and thus increase the efficiency of heat transfer between the air and the wall 138 of the heat treatment chamber 130.

Various modifications may be made to the apparatus 110 described above. For examples, if desired, the amount of secondary air entering the apparatus 110 through inlet 142 could be throttled by a valve or valves 148 to provide a control over the volume of secondary air mixed with the hot air. In the apparatus shown, wall 138 of the heat treatment chamber 130 comprises part of the drum 114 and thus rotates with the drum 114, in an opposite direction to the auger 135. If desired, the wall 138 may be stationary.

After the material was heat treated, the material was washed and partially redried.

Figure 7:
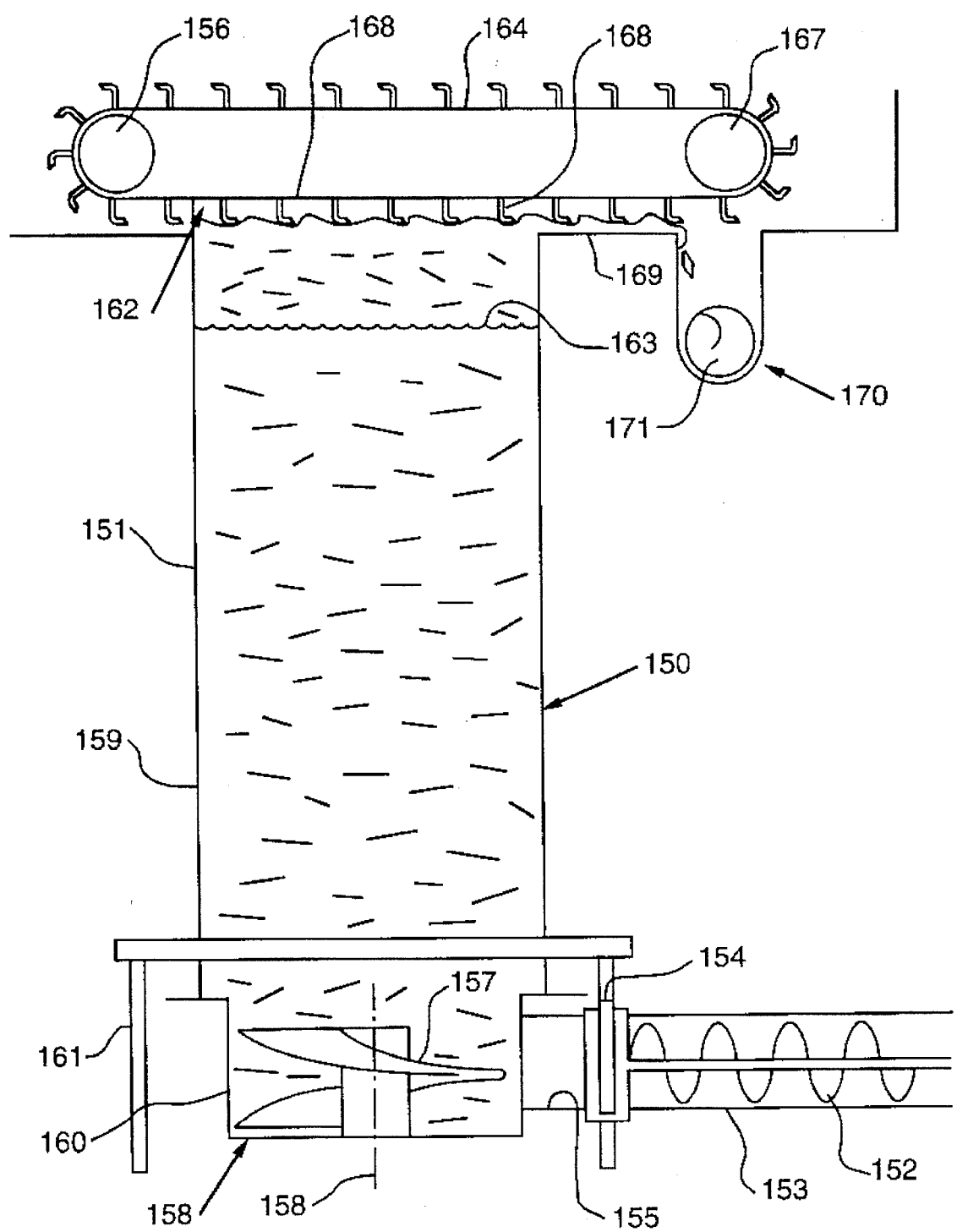
FIG. 7 is a side illustrative sectional view of a washing apparatus being a further pan of the second embodiment of biomass treatment system.

Referring now to FIG. 7, there is shown the washing apparatus 150 which was used to enable the heat treated material to be washed and partially redried.

The apparatus 150 comprises a tower 151 into which material is conveyed at the foot thereof, via an auger 152 in a conveying chamber 153, which may for example be at an end of a further heat treatment chamber as described above with reference to the FIGS. 5 and 6 arrangement, or the end of heat treatment chamber 130.

A sliding valve 154 is provided to close the inlet 155 to the tower 151 and prevent the escape of water therefrom when material is not being fed along chamber 153 by the auger 152.

At the lower end 156 of the tower 151, there is a screw 157 arranged to be rotated about a generally vertical axis 158 to cause the biomass material to be positively moved upwardly in the tower 151. The tower 151 is made in two sections in this example, a lower section indicated at 160, an upper section 159, which are separable for easy maintenance. The tower 151 is supported as a whole on a frame structure 161.

Water is introduced into the tower 151 at an upper end 162 thereof and the tower 151 is kept topped up with water to a level indicated at 163.

Water is periodically drained from the tower 151 via a drain opening at the lower end thereof and replenished with fresh water. By virtue of at least some ingredients of the biomass material tending to float, and the action of the screw 157, the material migrates upwardly in the tower.

It will be noted that the lower section 160 has a smaller cross sectional area than the upper section 159. This is to ensure that the material, which may swell as it becomes wetted, does not become immobile in the tower 151 by tightly gripping the inside wall of the tower 151 as could occur if the tower were of a constant cross sectional area throughout its height.

While the material is immersed in the water it is washed and some salts and sugars from the material are removed.

Spent water containing these nutrients may be used on the land for watering and fertilising.

The material is lifted above the water level 163 in the tower 161 by virtue of further material entering the tower 151, where it drains, and at the uppermost end 162 of the tower 151 a conveyor 164 is provided to remove the wetted material. This conveyor 164 comprises in this example a chain entrained about a pair of sprockets 166,167, and carrying a plurality of teaselers 168. The material is carried along a chute 169 to a position where it is discharged into a further conveyor 170 which comprises an auger 171, by which it is conveyed to a hydraulic or other press station where the heat treated and washed material is squeezed to leave a desired moisture content and to facilitate packaging.

Again many modifications can be made to the washing apparatus 150. For example, means other than the screw 157 could be provided to urge the material upwardly in the tower 151, and the conveyor 164 is only one example of a method by which the material can be removed from the upper end 162 of the tower 151. The chute 169 may lead directly to a press or other means for partially redrying the material, if desired.

It has been found that the material produced by each of the examples described is an ideal substitute for peat on its own or blended with other materials, and is suitable for planting out, soil conditioning, mulching, and other specialist uses, such as lawn dressing, blocking, mushroom casing, and growing ericaceous (heath) plants.

Heavy soil such as clay, can be conditioned with the material in that drainage is improved. In a light soil, the material is able to conserve moisture.

Indeed the material produced has significant advantages over peat in that the material produced can be dried almost to 0% moisture content, and re-wetted without spoiling its peat-like properties. Peat however, if dried out to too great an extent, disintegrates into dust and if re-wetted, merely forms a sludge.

Hence the material produced by the invention can be sold in a dry condition whereas peat always has to be sold with a moisture content, by weight, of about 50%. Because the moisture retention properties of the material enable the water content to be controlled, the material can however be sold with any desired moisture content within a wide range.

In order to achieve peat having a desired coarse, medium or fine consistency, it is usual to blend different kinds of peat. With the method of the invention, it has been found that it is simply necessary to mill the biomass material into fragments of a different size so that the end product can have widely varying constitutions for use as a peat substitute. The final product is sterile and of an acceptable brown colour.

In the methods described, the spent water used for washing, is rich in salts such as potassium chloride, and nitrates and sugars, and thus may readily be used for the irrigation of agricultural land, to improve crop yields.

Of course, in order to perform the method of the invention, it is not essential to use the various apparatus described although the various apparatus described have been found particularly to be effective in treating the material.

Generally it has been found that by heat treating in a closed apparatus which comprises an auger, the tendency of the material being treated spontaneously to combust, is suppressed. Furthermore, the heat treatment chamber constructions described, ensure that the material is agitated or churned as it is conveyed, thereby uniformly to heat treat the material.

If greater agitation or churning is required, this can be achieved using an undersized auger, with respect to its outer respective tube. This makes the auger less efficient as a conveyor but increases the amount of agitation.

To treat a material other than oil seed rape straw, it may be necessary to heat the material to a temperature higher or lower than 250° C., but in each case, partial pyrolysis of the material is achieved, such that the material does not undergo combustion. Thus the colour of the material is modified and because only partial pyrolysis occurs, there is no great loss in weight as the material is heat treated.

If desired, after heat treatment, the material need not be washed as described, but may be used "as is" for example as a mulch. However, washing and partial redrying is preferred as this has been found to improve the resistance of the sterile end product to reinfection.

Initial drying of the material in an apparatus as described need not be carried out, but preferably some drying occurs or otherwise quantities of steam will be produced in the heat treatment chamber which will need to be removed from the heat treatment chamber so that the material is dry heated. In any event, the material must be heat treated without wetting so as not to aggravate the problem of steam being produced, and to ensure that the desired physical changes occur to the material.

Any dust or fines entrained in the air passing from the dryer can be filtered out and used as a bio fuel.

It will be appreciated that in both examples described, the heat treatment is carried out substantially at ambient pressure, thus making the methods described particularly suitable for a continuous process, necessary for treating large volumes of material.

The features disclosed in the foregoing description, the following claims or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. A method of treating biomass material selected from the group consisting of vegetable matter and organic waste for producing a peat substitute for use in plant transplanting, soil conditioning, mulching and the like, the method comprising heating the biomass material without wetting, and substantially at ambient pressure, to a treatment temperature of 200° C. up to about 250° C. for 0.5 up to 10 minutes to allow the material to undergo partial pyrolysis only, and subsequently wetting and partially redrying the material to leave a moisture content of at least 50%, whereby salts and residual sugars in the biomass are removed from the material.

2. A method according to claim 1 which includes the step of drying the biomass material or permitting the biomass material initially to dry, at a lower temperature than the treatment temperature to which the material is subsequently heated.

3. A method according to claim 2 wherein the biomass material is initially dried at a temperature of about 100° C. or less.

4. A method according to claim 1 which includes the step of mechanically acting upon the biomass material to crush and cut the material to fragments which are able to pass through a mesh having a sieve size of between 1 and 12 mm.

5. A method according to claim 4 wherein the step of crushing and cutting the material is carried out prior to heating the material to the treatment temperature.

6. A method according to claim 1 wherein the material is heated to the treatment temperature for less than ten minutes.

7. A method according to claim 6 wherein the material is heated to the treatment temperature for less than five minutes.

8. A method according to claim 1 wherein the material is washed subsequent to heating to the treatment temperature while it is at a temperature elevated above ambient temperature.

9. A method according to claim 1 wherein the biomass material comprises straw, said straw being a remnant created during the heating of crops.

10. A method according to claim 1 wherein said step of partially redrying the material comprises squeezing the material to remove water.

* * * * *

UNITED STATES PATENT AND TRADEMARK OFFICE
CERTIFICATE OF CORRECTION

PATENT NO. : 5,542,962
DATED      : August 6, 1996
INVENTOR(S): Robert C. A. W. Ollerenshaw and
             Maurice A. Roe It is certified that error appears in the above-indentified patent and that said Letters Patent is hereby corrected as shown below:

Column 1 Line 40 "FIG." should read --FIGS.--.

Column 1 Line 44 "find" should read --and--.

Column 1 Line 55 "pan" should read --part--.

Column 3 Line 47 "pant" should read --part--.

Column 4 Line 14 "compaction-" should read --compaction--.

Signed and Sealed this

Twelfth Day of November, 1996

Attest:

BRUCE LEHMAN

*Attesting Officer*      *Commissioner of Patents and Trademarks*